Patented June 21, 1932

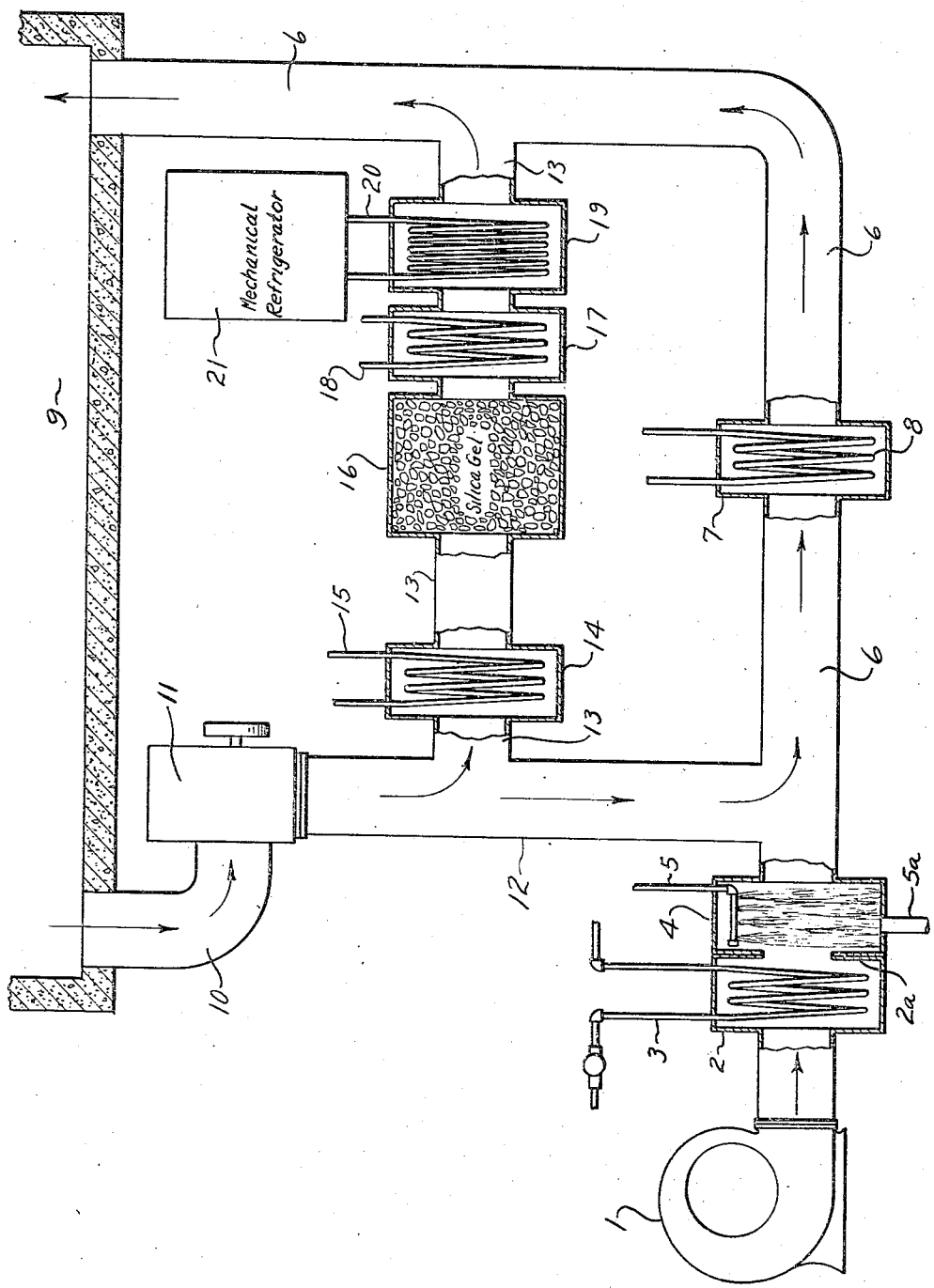

1,863,579

UNITED STATES PATENT OFFICE

CLARK T. MORSE AND EDWARD L. HOGAN, OF DETROIT, MICHIGAN, ASSIGNORS TO AMERICAN BLOWER CORPORATION, OF DETROIT, MICHIGAN, A CORPORATION OF DELAWARE

METHOD AND APPARATUS OF AIR CONDITIONING

Original application filed November 22, 1929, Serial No. 408,955. Divided and this application filed May 18, 1931. Serial No. 538,035.

This invention relates to a method and apparatus for conditioning air and delivering the conditioned air to a room or chamber.

It is also an object of this invention to cause a recirculation of the air from the chamber or room and reconditioning the recirculating air and directing it back into the room or chamber.

It is a further object of this invention to provide a means for conditioning fresh air and delivering it into a stream of recirculating air and directing the stream into a chamber or room. The conditioning of the air is brought about by applying to the air, cooling means consisting of coils of pipes having flowing water therein, treating the air to moisture and conditioning the air by artificial refrigeration.

These and other advantages will appear from the following description taken in connection with the drawing, in which a preferred embodiment of the invention is shown.

Referring to the drawing,

The drawing shows a preferred form of the invention.

This application is a division of a co-pending application No. 408,955 and relates to conditioning, circulating and reconditioning air. For the purpose of creating a current or stream of air, a source of air in the form of a fan or blower 1 is used, from which a pipe extends and leads into a cooler 2, which has coiled therein a water pipe 3, through which cold water is passed for cooling the air immediately after it leaves the fan or blower.

Immediately adjacent the cooler and separated therefrom by a partition 2a with the passageway therein is a washer 4 to which sprays of water are delivered by a water pipe 5. From the washer a discharge pipe 5a is used for taking off the surplus water. By means of the washer, dust, dirt and other foreign matters are removed from the air and a certain amount of moisture is absorbed by the air. From the washer the air thus treated passes through a pipe 6, which leads into a room or enclosure 9. In the pipe 6, intermediate its exit end and the washer 4, is a cooler 7 in which a pipe 8 is coiled. This pipe has cool water circulating therein for moderately reducing the temperature of the air passing through the pipe 6 before it reaches the room or enclosure 9.

From the room or enclosure 9 is a return or exit pipe 10, which leads into a blower or fan 11 which has an exit pipe 12 leading therefrom and connecting into the pipe 6 adjacent the washer 4. If the fan 11 should not be operating, the air may pass from the washer 4 by way of pipe 6 and pipe 12. The air from the pipe 12, either from the fan 11 or from the fan 1, passes through a branch pipe 13, which leads into a cooler 14 having therein a coiled cooling pipe 15, through which water passes for moderate cooling purposes. The pipe 13, after passing through the cooler 14, leads into a silica gel container 16 having a bed of silica gel therein. The air, after passing through the bed of silica gel, passes into a cooler 17 which has therein a coiled pipe 18 for the passage of cool water. Adjacent the cooler 17 is a refrigeration cooler 19, which has coiled therein a refrigeration pipe 20, which has connection to a mechanical refrigerator 21 for mechanically lowering the temperature of the air as it passes through the refrigeration cooler 19.

The air from the fan or blower 1 may pass through the pipe 6 into the room or chamber 9, or part of it may be diverted and pass through pipes 12 and 13 and reunited to pipe 6 after it has passed through the silica gel, the cooling and refrigerating coils.

In the case of recirculating of the air, the air is delivered to the room or enclosure through pipe 6 and escapes from the room through pipe 10 by means of the fan or blower 11. This air may pass through pipe 12 and into pipe 6, or it may be diverted through pipe 13 through the cooling coils, the silica gel and back into pipe 6 by this route. If both the fans or blowers are operating, the recirculation air would largely recirculate through the pipe 13, where it is cooled and conditioned by means of the coils and the silica gel.

The pupose of the silica gel is to remove from the air all surplus moisture. The purpose of the mechanical refrigeration is to lower the temperature of the air below that produced by the water coils. When the air passes into and through the silica gel container, its temperature rises and its humidity is materially lowered so that a relatively high temperature and a low dew point are secured. Since the air passes through the cooler 17 and the refrigeration cooler 19, by which the dry air is cooled, the relative humidity of the air and temperature can be regulated by means of the different cooling elements and by means of the washer 4. The reconditioning air and the air from the fan 1 pass into the room or compartment by the same entrance.

If the cooling coil 3 cooled the air to its dew point temperature or any temperature where it was saturated with moisture and the water in the air washer were recirculated, there would be no moisture taken from the air or no moisture added to the air. The water, being recirculated, would remain at the wet bulb temperature of the incoming air, which, if the air was cooled to its dew point temperature, would also be the dew point temperature. In other words, then the dry bulb temperature, the wet bulb temperature, and the dew point temperature would all be the same, and this might be an ideal condition in that it would wash the air without adding any moisture to it.

If the water in the air washer were cooled below the wet bulb temperature of the air entering the washer, it would then dehumidify the air as it passed through the washer.

If the cooling coil 3 did not cool the air down to its dew point temperature, and the water in the washer were recirculated, then some moisture would be added to the air as it was reduced from its dry bulb temperature to its wet bulb temperature in passing through the washer.

In other words, by regulating the temperature of the fluid in coil 3, and the temperature of the water in the washer, the air could be heated or cooled, humidified or dehumidified, or its sensible heat could be removed and the air washed, that is, it could be cooled down to its dew point temperature and then the air washed with recirculating water so that there would be no change in moisture content in the air, although it were cooled.

It will be understood that we desire to comprehend within our invention such modifications as may be necessary to adapt it to varying conditions and uses.

Having thus fully described our invention, what we claim as new and desire to secure by Letters Patent, is:—

1. In a method of air conditioning, precooling and dehumidifying an incoming air stream, removing from an enclosure a body of recirculation air, delivering a portion of it into the incoming fresh air, dehumidifying and cooling the other portion of it, consolidating the mixed fresh air and recirculation air and the dehumidified cooled air into a common stream, and returning said stream to the original enclosure.

2. In a method of air conditioning, standardizing an incoming air stream to a predetermined temperature and dew point, mixing with said stream a portion of the air of an enclosure, removing another portion of the air from an enclosure, precooling it, dehumidifying it, again cooling it, and then mixing all of said streams together and returning them to the enclosure.

3. In a method of air conditioning, standardizing incoming fresh air to a predetermined temperature and humidity, mixing with said air recirculation air from an enclosure, cooling the mixed body, extracting another body of air from said enclosure, precooling it, dehumidifying it, cooling it to a lower temperature than the precooling, and mixing all of said bodies of air into a common stream, and delivering said common stream to an enclosure.

4. In combination, means for supplying fresh air, means to precool, and means to dehumidify said air, means to convey recirculation air from an enclosure into said main air stream, means to return said mingled streams to the enclosure, a shunt line between said exit recirculation line and return line for diverting a portion of the recirculation air across these lines, a precooler in said shunt line comprising a water coil, a silica gel container in said line, and mechanically refrigerated cooler at a lower temperature for cooling the air in the shunt line after it passes through the silica gel.

5. In the process of conditioning air, causing the air to circulate in a stream, dividing the stream into two parts, dehydrating and cooling one part, forcing fresh air into the other part, and thereafter causing the parts to reunite into a single stream.

6. In the process of conditioning air, causing the air to circulate in a stream, dividing the stream into two parts, dehydrating one part, forcing fresh air into the other part, cooling the mixture, and causing the two parts to reunite into a single stream.

7. In an air conditioning apparatus in combination with an enclosure, means for forcing a stream of air into said enclosure, means for withdrawing the air from the enclosure, and means to recondition the withdrawn air, said means comprising a cooler, and means to remove moisture from the air so cooled after it is cooled.

8. In an air conditioning apparatus in combination with an enclosure, means for forcing a stream of fresh air into said enclosure, means to reduce the temperature of said stream before it reaches the enclosure, means to withdraw air from the enclosure and force it into said stream, and means to condition said withdrawn air before reaching said stream, said means comprising dehydrating means and mechanical refrigerating means.

9. In an air conditioning apparatus in combination with an enclosure, means to force a stream of air into said enclosure, means to apply water to said stream, means to reduce the temperature of said stream before it reaches said enclosure, means to withdraw the air from said enclosure and return it to said stream, and means to recondition a part of said withdrawn air before it reaches said stream, said means consisting of a plurality of water cooled pipes, a dehydrating means and a refrigerating means.

In testimony whereof, we affix our signatures.

CLARK T. MORSE.
EDWARD L. HOGAN.